United States Patent
Singh et al.

(10) Patent No.: US 9,136,562 B2
(45) Date of Patent: Sep. 15, 2015

(54) MULTIPLE ELECTROLYTE ELECTROCHEMICAL CELLS

(75) Inventors: Mohit Singh, Berkeley, CA (US); Ilan Gur, San Francisco, CA (US); Hany Basam Eitouni, Oakland, CA (US); Nitash Pervez Balsara, El Cerrito, CA (US)

(73) Assignee: Seeo, Inc., Hayward, CA (US)

( * ) Notice: Subject to any disclaimer, the term of this patent is extended or adjusted under 35 U.S.C. 154(b) by 277 days.

(21) Appl. No.: 13/128,232

(22) PCT Filed: Nov. 6, 2009

(86) PCT No.: PCT/US2009/063643
§ 371 (c)(1),
(2), (4) Date: Jul. 22, 2011

(87) PCT Pub. No.: WO2010/054261
PCT Pub. Date: May 14, 2010

(65) Prior Publication Data
US 2011/0281173 A1 Nov. 17, 2011

Related U.S. Application Data

(63) Continuation-in-part of application No. 12/867,665, filed as application No. PCT/US2009/034156 on Feb. 13, 2009, and a continuation-in-part of application No. 12/988,474, filed as application No.
(Continued)

(51) Int. Cl.
*H01M 10/40* (2006.01)
*H01M 4/36* (2006.01)
(Continued)

(52) U.S. Cl.
CPC ............ *H01M 10/0565* (2013.01); *H01M 2/16* (2013.01); *H01M 10/052* (2013.01); *H01M 10/0566* (2013.01); *H01M 2300/0094* (2013.01); *Y02E 60/122* (2013.01)

(58) Field of Classification Search
CPC . H01M 2/16; H01M 10/052; H01M 10/0566; H01M 10/0565; H01M 2300/94
USPC .............. 429/306, 304, 207, 209, 218.1, 219, 429/221, 229, 231.1, 231.2, 231.4, 231.5, 429/231.8, 231.95
See application file for complete search history.

(56) References Cited

U.S. PATENT DOCUMENTS

| | | |
|---|---|---|
| 4,427,747 A | 1/1984 | Bennett |
| 4,469,761 A | 9/1984 | Bennett |

(Continued)

FOREIGN PATENT DOCUMENTS

WO 9816960 4/1998

OTHER PUBLICATIONS

Aldissi, "Multi-layered polymer electrolytes towards interfacial stability in lithium ion batteries," J. Power Sources 94 (2001) 219-224.
(Continued)

*Primary Examiner* — Kenneth Douyette
(74) *Attorney, Agent, or Firm* — R'Sue Popowich Caron

(57) ABSTRACT

Electrode assemblies for use in electrochemical cells are provided. The negative electrode assembly comprises negative electrode active material and an electrolyte chosen specifically for its useful properties in the negative electrode. These properties include reductive stability and ability to accommodate expansion and contraction of the negative electrode active material. Similarly, the positive electrode assembly comprises positive electrode active material and an electrolyte chosen specifically for its useful properties in the positive electrode. These properties include oxidative stability and the ability to prevent dissolution of transition metals used in the positive electrode active material. A third electrolyte can be used as separator between the negative electrode and the positive electrode.

37 Claims, 8 Drawing Sheets

Related U.S. Application Data

PCT/US2009/041180 on Apr. 21, 2009, now abandoned.

(60) Provisional application No. 61/112,605, filed on Nov. 7, 2008, provisional application No. 61/028,443, filed on Feb. 13, 2008, provisional application No. 61/046,685, filed on Apr. 21, 2008.

(51) Int. Cl.
*H01M 4/48* (2010.01)
*H01M 10/0565* (2010.01)
*H01M 2/16* (2006.01)
*H01M 10/052* (2010.01)
*H01M 10/0566* (2010.01)

(56) References Cited

U.S. PATENT DOCUMENTS

| | | |
|---|---|---|
| 5,314,765 A | 5/1994 | Bates |
| 5,445,905 A | 8/1995 | Marsh |
| 5,900,183 A * | 5/1999 | Kronfli et al. ............... 252/62.2 |
| 6,025,094 A | 2/2000 | Visco |
| 6,280,882 B1 * | 8/2001 | Vallee et al. ................. 429/303 |
| 6,645,675 B1 * | 11/2003 | Munshi .......................... 429/305 |
| 6,780,542 B2 | 8/2004 | Spillman |
| 6,844,115 B2 | 1/2005 | Gan |
| 7,026,071 B2 | 4/2006 | Mayes |
| 7,318,982 B2 | 1/2008 | Gozdz |
| 2002/0048706 A1 * | 4/2002 | Mayes et al. ............... 429/231.1 |
| 2003/0134204 A1 * | 7/2003 | Gan et al. ..................... 429/332 |
| 2005/0031953 A1 * | 2/2005 | Watanabe et al. ............. 429/210 |
| 2005/0034993 A1 * | 2/2005 | Gozdz et al. ..................... 205/57 |
| 2006/0127766 A1 * | 6/2006 | Yamate ....................... 429/218.1 |
| 2006/0141346 A1 | 6/2006 | Gordon |
| 2007/0172739 A1 | 7/2007 | Visco |
| 2008/0241690 A1 | 10/2008 | Delacourt |
| 2009/0104537 A1 | 4/2009 | Deschamps |

OTHER PUBLICATIONS

Lee, et al, "Submicroporous/microporous and compatible/incompatible multi-functional dual-layer polymer electrolytes and their interfacial characteristics with lithium metal anode," J. Power Sources 163 (2006) 264-268.

\* cited by examiner

MULTIPLE ELECTROLYTE ELECTROCHEMICAL CELLS

CROSS-REFERENCE TO RELATED APPLICATIONS

This application claims priority to U.S. Provisional Patent Application 61/028,443, filed Feb. 13, 2008 to International Application No. PCT/US09/34156 filed Feb. 13, 2009, to to co-pending U.S. patent application Ser. No. 12/867,665 filed Aug. 13, 2010, to U.S. Provisional Patent Application 61/046,685, filed Apr. 21, 2008 to International Application No. PCT/US09/41180 filed Apr. 21, 2009, to co-pending U.S. patent application Ser. No. 12/988,474 filed Oct. 18, 2010, to U.S. Provisional Patent Application 61/112,605, filed Nov. 7, 2008, and to International Application No. PCT/US09/63643 filed Nov. 6, 2009, all of which are incorporated by reference herein.

This application is related to U.S. Provisional Patent Application 61/112,596, filed Nov. 7, 2008 (converted to International Application No. PCT/US09/63655 filed Nov. 6, 2009) and to U.S. Provisional Patent Application 61/112,592, filed Nov. 7, 2008 (converted to International Application No. PCT/US09/63653 filed Nov. 6, 2009), both of which are incorporated by reference herein.

BACKGROUND OF THE INVENTION

Field of the Invention

This invention relates generally to lithium batteries, and, more specifically, to the use of a variety of electrolytes in the same lithium battery to optimize its performance.

In order to be useful in a cell, an electrolyte is chemically compatible/stable with both the anode material and the cathode material. In addition, the electrolyte is electrochemically stable, that is stable against reduction at the anode and oxidation at the cathode when the cell is at potential. These requirements are especially difficult to meet in lithium batteries because of the extreme reactivity of the lithium itself. When a liquid electrolyte is used, it permeates both the anode and the cathode, as well as the separator, so the one electrolyte must meet all criteria. Thus some compromises must be made in choice of electrolyte, as the electrolyte that is best for the anode and the electrolyte that is best for the cathode may not be the same.

Thus there is a clear need for a battery cell design in which different portions of the cell can contain different electrolytes, each optimized for its particular function, but all functioning together without compromising the overall operation of the cell.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

The preferred embodiments are illustrated in the context of electrolytes in an electrochemical cell. The skilled artisan will readily appreciate, however, that the materials and methods disclosed herein will have application in a number of other contexts where optimizing electrochemical interactions between electrolytes and electrochemically active materials are important. These electrolytes can be useful in electrochemical devices such as capacitors, electrochemical/capacitive memory, electrochemical (e.g., dye sensitized) solar cells, and electrochromic devices.

These and other objects and advantages of the present invention will become more fully apparent from the following description taken in conjunction with the accompanying drawings.

In this disclosure, the terms "negative electrode" and "anode" are both used to mean "negative electrode." Likewise, the terms "positive electrode" and "cathode" are both used to mean "positive electrode."

In this disclosure, the term "dry polymer" is used to mean a polymer with long chains that has not been plasticized by any small molecules. Organic solvents or plasticizers are not added to such dry polymers.

Although not always mentioned explicitly, it should be understood that electrolytes, as described herein, include metal salt(s), such as lithium salt(s), to ensure that they are ionically conductive. Non-lithium salts such as other alkali metal salts or salts of aluminum, sodium, or magnesium can also be used.

An electrochemical cell has a negative electrode assembly and a positive electrode assembly with an ionically conductive separator in between. In one embodiment of the invention, the negative electrode assembly contains at least negative electrode active material and an electrolyte that has been chosen specifically for use with the negative electrode active material, referred to herein as the NE (negative electrode) electrolyte.

Figure 1:
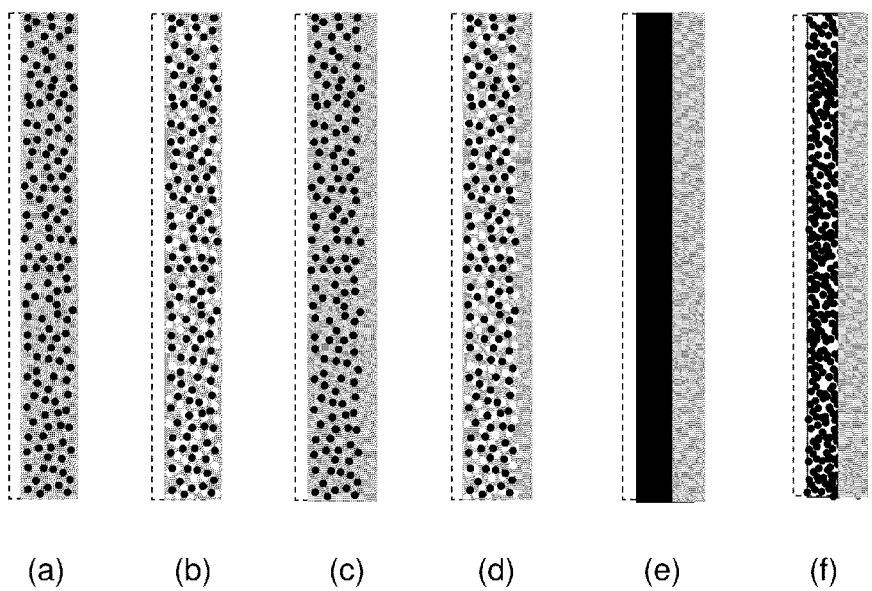
FIG. 1 is a schematic illustration of various negative electrode assemblies, according to embodiments of the invention.

FIG. 1 illustrates various exemplary arrangements for negative electrode active material (black regions) and NE electrolyte (grey regions). The negative electrode active material can be arranged as particles (FIGS. 1a-1d, 1f) or as a thin film or foil (FIG. 1e). The negative electrode assembly can be formed by combining the negative electrode material particles with the NE electrolyte to form a composite layer (FIGS. 1a-1d). In some arrangements, other materials (not shown) can be added to the composite layer to enhance, for example, electronic or ionic conduction. In some arrangements, the composite is porous, i.e., contains voids which are shown as white spaces in FIGS. 1b, 1d; in other arrangements, the composite is pore-free (FIGS. 1a, 1c). In yet other arrangements, the NE dry polymer electrolyte shown in FIGS. 1e and 1f can also contain pores. In a negative electrode assembly that has a composite layer, the NE dry polymer electrolyte may be contained entirely within the composite layer (FIGS. 1a, 1b). In another arrangement, there can be a thin layer of additional NE dry polymer electrolyte adjacent the composite layer (FIGS. 1c, 1d). In some arrangements, a current collector (shown as a white layer defined by dashed lines) is also part of the negative electrode assembly.

In arrangements where the negative electrode active material is a thin film or foil, the negative electrode assembly contains at least the thin film or foil and a layer of the NE electrolyte adjacent and in ionic contact with the thin film or foil, as shown in FIG. 1e. In some arrangements, the negative electrode material is not a solid thin film, but instead is arranged as an aggregation of negative electrode active material particles in close contact with one another to ensure ionic and electronic communication among the particles (FIG. 1f). Such a structure can be made, for example, by pressing and/or by sintering the negative electrode active material particles. In some arrangements, other materials can be added to the layer of negative electrode material particles, for example, to enhance electronic or ionic conductivity. In one arrangement carbon particles added to enhance electronic conductivity. The negative electrode assembly contains at least the NE electrolyte layer in ionic communication with the layer of negative electrode active material particles. In some arrangements there is also a current collector (shown as a white layer defined by dashed lines) in electronic contact with the negative electrode assembly.

The NE electrolyte is chosen specifically for use with the negative electrode active material. In one embodiment of the invention, the NE electrolyte is a dry polymer (a polymer with long chains that has not been plasticized by any small molecules) electrolyte. The NE electrolyte is electrochemically stable against the negative electrode active material. That is to say that the NE electrolyte is reductively stable and resistant to continuous chemical and electrochemical reactions which would cause the NE electrolyte to be reduced at its interface with the negative electrode material. The NE electrolyte is resistant to reduction reactions over the range of potentials that the electrochemical cell experiences under conditions of storage and cycling. Such reduction reactions at the negative electrode would increase cell impedance, thus adversely affecting the performance of the cell and/or the capacity of the cell. In addition, the NE electrolyte is chemically stable against the negative electrode active material.

In one embodiment of the invention, the negative electrode assembly has a thin film or foil as the negative electrode active material (as shown in FIG. 1e), and the NE dry polymer electrolyte has a high modulus in order to prevent dendrite growth from the film during cell cycling. The NE dry polymer electrolyte also has good adhesion to the film or foil to ensure easy charge transfer and low interfacial impedance between the layers. In one arrangement, the NE dry polymer electrolyte is void free. The NE dry polymer electrolyte is electrochemically stable down to the lowest operating potential of the electrode. For example, with Li—Al planar electrodes, the NE dry polymer electrolyte is stable down to 0.3 V vs Li/Li$^+$. See Table 1 for other NE active materials and their associated potentials. In one arrangement, the NE dry polymer electrolyte is mechanically rigid enough to prevent continuous reactivity of active material particles that undergo large volume changes during cell cycling by keeping them in electrical contact with the matrix of the composite electrode. When negative electrode active materials that undergo large volume expansion upon absorption of lithium are used as thin film electrodes, it is useful if the NE dry polymer electrolyte has high yield strain to prevent electrode fatigue.

In another embodiment of the invention, the negative electrode active material is an alloy (examples of which are shown in Table 1) and has the form of particles. In order to prevent continuous reactivity, it is useful if the NE electrolyte is electrochemically stable down to the reduction potentials shown. Additionally it is useful if the NE electrolyte has high impact toughness in order to maintain mechanical integrity and high yield strain in order to accommodate the volume change of the NE active material particles as they absorb and release lithium. It is also useful if the NE electrolyte contains voids that can shrink to accommodate expansion. Good compatibility between the electrolyte and the particle surfaces helps to ensure good adhesion and homogeneous dispersion. Finally, if a current collector is used, it is useful if the NE electrolyte can adhere to the current collector.

TABLE 1

Negative Electrode Active Material Characteristics

| Negative Electrode Active Material | Reduction Potential vs. Li/Li+ (volts) | Maximum Volumetric Expansion |
| --- | --- | --- |
| Li-Si | 0.4 | 30%-400% |
| Li-Al | 0.3 | 30%-100% |
| Li-Sn | 0.5 | 30%-450% |
| graphite | 0.2 | ~25% |

The negative electrode active material can be any of a variety of materials depending on the type of chemistry for which the cell is designed. In one embodiment of the invention, the cell is a lithium or lithium ion cell. The negative electrode material can be any material that can serve as a host material (i.e., can absorb and release) lithium ions. Examples of such materials include, but are not limited to graphite, lithium metal, and lithium alloys such as Li—Al, Li—Si, Li—Sn, and Li—Mg. In one embodiment of the invention, a lithium alloy that contains no more than about 0.5 weight % aluminum is used. Silicon and silicon alloys are known to be useful as negative electrode materials in lithium cells. Examples include silicon alloys of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) and mixtures thereof. In some arrangements, graphite, metal oxides, silicon oxides or silicon carbides can also be used as negative electrode materials.

Figure 2:
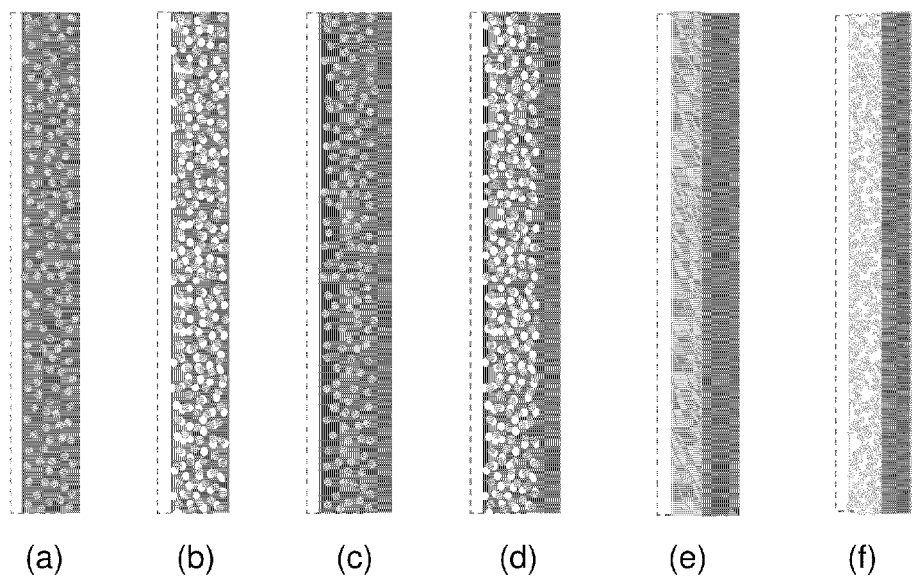
FIG. 2 is a schematic illustration of various positive electrode assemblies, according to embodiments of the invention.

In one embodiment of the invention, a positive electrode assembly contains at least positive electrode active material and an electrolyte that has been chosen specifically for use with the positive electrode active material, referred to herein as a PE (positive electrode) electrolyte. FIG. 2 illustrates various exemplary arrangements for the positive electrode active material (light grey regions) and the PE electrolyte (dark grey regions). The positive electrode active material can be arranged as particles (FIGS. 2a-2d) or as a thin film or foil (FIG. 2e). The positive electrode assembly can be formed by combining the positive electrode material particles with the PE electrolyte to form a composite layer (FIGS. 2a-2d). In some arrangements, other materials (not shown) can be added to the composite layer to enhance, for example, electronic conduction. In some arrangements, the composite is porous, i.e., contains voids, which are shown as white spaces in FIGS. 2b, 2d; in other arrangements, it is pore-free (FIGS. 2a, 2c). In yet other arrangements (not shown), the PE electrolyte shown in FIGS. 2e and 2f can also contain pores. In a positive electrode assembly that has a composite layer, the PE electrolyte may be contained entirely within the composite layer (FIGS. 2a, 2b). In another arrangement, there can be a thin layer of additional PE electrolyte adjacent the composite layer (FIGS. 2c, 2d). In some arrangements, a current collector (shown as a white layer defined by dashed lines) is also part of the positive electrode assembly.

In arrangements where the positive electrode active material is a thin film or foil, the positive electrode assembly contains at least the thin film or foil and a layer of the PE electrolyte adjacent and in ionic contact with the thin film or foil as shown in FIG. 2e. In some arrangements, the positive electrode material is not a solid thin film, but instead is arranged as an aggregation of positive electrode active material particles close together to ensure ionic and electronic communication among the particles (FIG. 2f). Such a structure can be made, for example, by pressing and/or by sintering the positive electrode active material particles. In some arrangements, other materials such as carbon particles can be added to the layer of positive electrode material particles, for example, to enhance electronic or ionic conductivity. The positive electrode assembly contains at least the PE electrolyte layer in ionic communication with the layer of positive electrode active material particles. In some arrangements there is also a current collector (shown as a white layer defined by dashed lines) in electronic contact with the positive electrode.

The PE electrolyte is chosen specifically for use with the positive electrode active material. In one embodiment of the invention, the PE electrolyte is a dry polymer (a polymer with long chains that has not been plasticized by any small molecules) electrolyte. The PE electrolyte is chosen to be oxidatively stable against the positive electrode active material. That is to say that the PE electrolyte is resistant to continuous chemical and electrochemical reactions which would cause the PE electrolyte to be oxidized at its interface with the positive electrode material. The PE electrolyte is resistant to oxidation reactions over the range of potentials that the electrochemical cell experiences under conditions of storage and cycling. Such oxidation reactions at the positive electrode would increase cell impedance, thus adversely affecting the performance of the cell and/or the capacity of the cell. In addition, the PE electrolyte is chemically stable against the positive electrode active material.

The positive electrode active material can be any of a variety of materials depending on the type of chemistry for which the cell is designed. In one embodiment of the invention, the cell is a lithium or lithium ion cell. The positive electrode active material can be any material that can serve as a host material for lithium ions. Examples of such materials include, but are not limited to materials described by the general formula $Li_xA_{1-y}M_yO_2$, wherein A comprises at least one transition metal selected from the group consisting of Mn, Co, and Ni; M comprises at least one element selected from the group consisting of B, Mg, Ca, Sr, Ba, Ti, V, Cr, Mn, Fe, Co, Ni, Cu, Al, In, Nb, Mo, W, Y, and Rh; x is described by $0.05 \leq x \leq 1.1$; and y is described by $0 \leq y \leq 0.5$. In one arrangement, the positive electrode material is $LiNi_{0.5}Mn_{0.5}O_2$.

In one arrangement, the positive electrode active material is described by the general formula: $Li_xMn_{2-y}M_yO_2$, where M is chosen from Mn, Ni, Co, and/or Cr; x is described by $0.05 \leq x \leq 1.1$; and y is described by $0 \leq y \leq 2$. In another arrangement, the positive electrode active material is described by the general formula: $Li_xM_yMn_{4-y}O_8$, where M is chosen from Fe and/or Co; x is described by $0.05 \leq x \leq 2$; and y is described by $0 \leq y \leq 4$. In another arrangement, the positive electrode active material is given by the formula $Li_x(Fe_yM_{1-y})PO_4$, where M is chosen from transition metals such as Mn, Co and/or Ni; x is described by $0.9 \leq x \leq 1.1$; and y is described by $0 \leq y \leq 1$. In yet another arrangement, the positive electrode active material is given by the general formula: $Li(Ni_{0.5-x}Co_{0.5-x}M_{2x})O_2$, where M is chosen from Al, Mg, Mn, and/or Ti; and x is described by $0 \leq x \leq 0.2$. In some arrangements, the positive electrode material includes $LiNiVO_2$.

Most electrolytes exhibit electrochemical stability over a limited window of about 4 Volts. Thus a single electrolyte cannot by itself support an electrochemical couple that has a voltage between electrodes higher than 4 Volts. Yet such high voltage electrochemical cells can be made to be stable and robust using the structures and materials described herein. Two different electrolytes—a NE dry polymer electrolyte that is reductively stable at the anode (but may or may not be oxidatively stable at the cathode) and a PE dry polymer electrolyte that is oxidatively stable at the cathode (but may or may not be reductively stable at the anode) can now be used in the same electrochemical cell. In one embodiment of the invention, the NE dry polymer electrolyte is optimized for reductive stability and the PE dry polymer electrolyte is optimized for oxidative stability. By allowing different electrolytes to be used at the negative electrode and at the positive electrode, each electrode can be designed for optimum performance without compromise. Such an arrangement is especially useful and for high voltage applications.

There have been efforts in recent years to develop high voltage (i.e., greater than ~4.2V) electrochemical cells by using "high voltage cathode materials" such as those listed in Table 2. Unfortunately, electrolytes that are stable to oxidation at the high potentials at the cathode/electrolyte interface are not generally stable to reduction at the lower potentials at the anode/electrolyte interface for standard anode materials. Now an electrochemical cell that uses different, specifically chosen electrolytes, such as dry polymer electrolytes, at the cathode and at the anode sides of the cell, as described herein, can overcome this problem and make it possible to design and build high voltage cells.

TABLE 2

Positive Electrode Active Material Characteristics

| Positive Electrode Active Material | Discharge Potential vs. Li/Li+ (volts) | Typical Charging cut off Potential Li/Li+ (volts) |
| --- | --- | --- |
| $LiFePO_4$ | 3.4 | 3.8 |
| $LiCoO_2$ | 3.6 | 4.2 |
| $LiMnPO_4$ | 4.1 | 4.3 |
| $LiAl_{0.05}Co_{0.15}Ni_{0.8}O_2$ | 3.6 | 4.3 |
| $LiCoPO_4$ | 4.8 | 5.0 |
| $LiNiPO_4$ | 5.1 | 5.4 |
| $Li_{1.07}Mn_{1.93}O_4$ | 3.9 | 4.3 |

Lithium metal and alloy negative electrode active materials are particularly prone to ongoing reduction reactions with many conventional lithium-ion electrolytes, as these negative electrode active materials tend not to form stable passivation layers. Although some electrolytes may be able to form stable interfaces with such anode materials, such electrolytes may not work well in the rest of the cell or in the positive electrode assembly due to limitations in conductivity and/or oxidative stability. Electrochemical cells that can use different electrolytes specifically chosen for their compatibility with each electrode, as described in the embodiments herein, can overcome these limitations.

The embodiments of the invention, as described above, can result in an electrochemical cell with very good performance. In one embodiment of the invention, such a cell has a Li cycling efficiency greater than 99.7%, over 500 cycles. In another embodiment of the invention, such a cell has a Li cycling efficiency of greater than 99.9%, over 500 cycles. In another embodiment of the invention, there is very little impedance increase at the negative electrode, the positive electrode, or at both electrodes as the cell is cycled. In one arrangement, the impedance value at 500 cycles increases by no more than 40% from the impedance value at 10 cycles. In another arrangement, the impedance value at 500 cycles increases by no more than 20% from the impedance value at 10 cycles. In yet another arrangement, the impedance value at 500 cycles increases by no more than 10% from the impedance value at 10 cycles. In one embodiment of the invention, the capacity of the electrolyte cell at 500 cycles decreases by no more than 40% from the capacity at 10 cycles. In another embodiment of the invention, the capacity of the electrolyte cell at 500 cycles decreases by no more than 20% from the capacity at 10 cycles. In yet another embodiment of the invention, the capacity of the electrolyte cell at 500 cycles decreases by no more than 10% from the capacity at 10 cycles. In yet another embodiment of the invention, the capacity of the electrolyte cell at 500 cycles decreases by no more than 5% from the capacity at 10 cycles.

When negative and positive electrode assemblies are each optimized independently, not only is it possible to optimize electrochemical stability, but it also presents the opportunity to overcome other key limitations that may be specific to individual electrode active materials.

For example, some negative electrode active materials undergo a large volume increase, as much as 300% or more, upon lithiation. Some examples are shown above in Table 1. For composite negative electrode assemblies that contain voids such as the electrode assemblies in FIGS. 1b, 1d, it is possible to accommodate volumetric expansion and contraction of the negative electrode active material upon cycling. It is useful if the NE electrolyte is a dry polymer electrolyte that has a yield strain greater than or equal to the maximum volume expansion of the negative electrode material. In this way, the NE electrolyte is elastic enough to move into the void space as the negative electrode active material expands. It is also useful if the total void space is as large as the maximum total volume expansion of the negative electrode active material. In other arrangements, the negative electrode material particles are shaped into a porous layer adjacent the NE electrolyte layer to form the negative electrode assembly as shown in FIG. 1f. The pores in the layer can accommodate expansion of the negative electrode active material. Further details about porous electrodes can be found in International Patent Application Number PCT/US09/52511, filed Jul. 31, 2009, which is included by reference herein.

In general, cathode active materials expand and contract much less during cell cycling than do anode active materials. Thus there are different mechanical considerations when choosing an electrolyte for a cathode rather than for an anode, and it may be desirable to choose different electrolytes for these two regions of an electrochemical cell. For example, if the positive electrode active material expands and contracts much less than the negative electrode active material, it may be optimal to employ an electrolyte that is less elastic for the cathode region of the cell or to create an electrode assembly for the cathode that does not include voids, thereby optimizing other key parameters in the cathode assembly such as mechanical robustness or energy density. One key factor in determining a good PE dry polymer electrolyte is whether the electrolyte can bind and keep the positive active material particles and any electronically conductive additives (e.g., carbon particles) intermixed and randomly dispersed through the manufacturing (e.g., casting, calendering) process despite significant difference in the densities of the particles.

For positive electrode active materials that contain transition metals, dissolution of these metals into a standard liquid electrolyte upon cycling can be a serious problem, especially in high voltage cells and at high temperatures. The dissolution can cause accelerated cell degradation or premature failure. Examples of possible failure mechanisms include:

a) the composition of the positive electrode active materials changes as the metals dissolve, adversely impacting the ability of the active material to absorb and release lithium, b) the dissolved metals can diffuse to the negative electrode and degrade the capacity of the negative electrode active material, c) the dissolved metals can diffuse to the negative electrode and degrade any passivation layer on the negative electrode active material, resulting in continual electrolyte reaction with the negative electrode active material, and d) the dissolved metals can create internal shorts or other defects within the cell.

For example, in the case of $Mn_2O_4$ positive electrode active material, it is useful if the electrolyte does not dissolve the electrochemically active manganese. In the case of a sulfur cathode, it is useful if the electrolyte does not dissolve the electrochemically active polysulfide. In one arrangement, less than 10% of the electrochemically active ion dissolves from the positive electrode active material after 500 cycles in the temperature range 45-80° C. In another arrangement, less than 5% of the electrochemically active ion dissolves from the positive electrode active material after 500 cycles in the temperature range 45-80° C. In yet another arrangement, less than 1% of the electrochemically active ion dissolves from the positive electrode active material after 500 cycles in the temperature range 45-80° C. This allows for selection of a separate non-dissolving electrolyte on the cathode side and can prevent diffusion of metal to the anode. Thus a positive electrode assembly can be optimized to prevent dissolution (e.g., by employing a ceramic or solid polymer electrolyte). Although dissolution of electrochemically active ions may not be an issue for the negative electrode assembly, other considerations may be important, such as high ionic conductivity or reductively stability, and it is likely that a different electrolyte would be preferred.

In one embodiment of the invention, the NE electrolyte and/or the PE electrolyte is a solid electrolyte. In one arrangement, the NE electrolyte and/or the PE electrolyte is a ceramic electrolyte. In another arrangement, the NE electrolyte and/or the PE electrolyte is a dry polymer electrolyte. In yet another arrangement, the NE electrolyte and/or the PE electrolyte is a dry block copolymer electrolyte.

In one embodiment of the invention, the NE electrolyte and/or the PE electrolyte is a liquid electrolyte or a gel containing a liquid electrolyte. When a liquid electrolyte is used, it is most useful if the liquid electrolyte is immiscible with electrolytes in adjacent regions of the cell or if a selectively permeable membrane is positioned to prevent mixing of the liquid electrolyte with adjacent electrolytes. Such a membrane allows electrochemical cations to move through, but not the liquid itself. In the absence of containment by such a membrane, miscible liquids can diffuse easily throughout the cell. If such diffusion were to occur, the benefits provided by using different electrolytes in different regions of the cell may be diminished or negated. In the worst case, active materials in the electrodes could be oxidized or reduced, seriously compromising the performance and/or the life of the cell.

In one embodiment of the invention, a separator electrolyte is used between the negative electrode assembly and the positive electrode assembly. In one embodiment of the invention, the separator electrolyte can be the same as either the NE electrolyte or as the PE electrolyte. In another embodiment, the separator electrolyte is different from both the NE electrolyte and the PE electrolyte. The separator electrolyte can be any of liquid electrolytes, solid electrolytes, polymer electrolytes, dry polymer electrolytes, and block copolymer electrolytes, independent of the NE electrolyte and the PE electrolyte. In some arrangements, the electrolytes are chosen so that no two liquid electrolytes are adjacent one another. When a liquid electrolyte is used, it is most useful if the liquid electrolyte is immiscible with electrolytes in adjacent regions of the cell or if a selective membrane is positioned at each interface to prevent mixing of the liquid electrolyte with adjacent electrolytes. Such a membrane allows electrochemical cations to move through but not the liquid itself. In the absence of containment, miscible liquids can diffuse easily throughout the cell. If such diffusion were to occur, the benefits provided by using different electrolytes in different regions of the cell may be diminished or negated. In the worst case, such diffusion could cause reduction at the negative electrode assembly and/or oxidation at the positive electrode assembly, causing premature failure of the cell.

In general, it is useful if the separator electrolyte has enough mechanical integrity to ensure that the negative electrode assembly and the positive electrode assembly do not come into electronic contact with one another. In some arrangements, when a liquid, gel, or soft polymer is used as the separator electrolyte, a separator membrane is used with it.

It is useful if any two electrolytes meeting at an interface are immiscible in each other and chemically compatible with each other. It is also useful if there is little or no impedance or concentration overpotential across the interface.

In one arrangement, all electrolytes are stable over the range of storage and operating temperatures and the range of operating potentials for the electrochemical cell. Using the embodiments described here, this condition can be met for electrode couples that are otherwise unstable with conventional electrolytes or in conventional single-electrolyte architectures.

Figure 3:
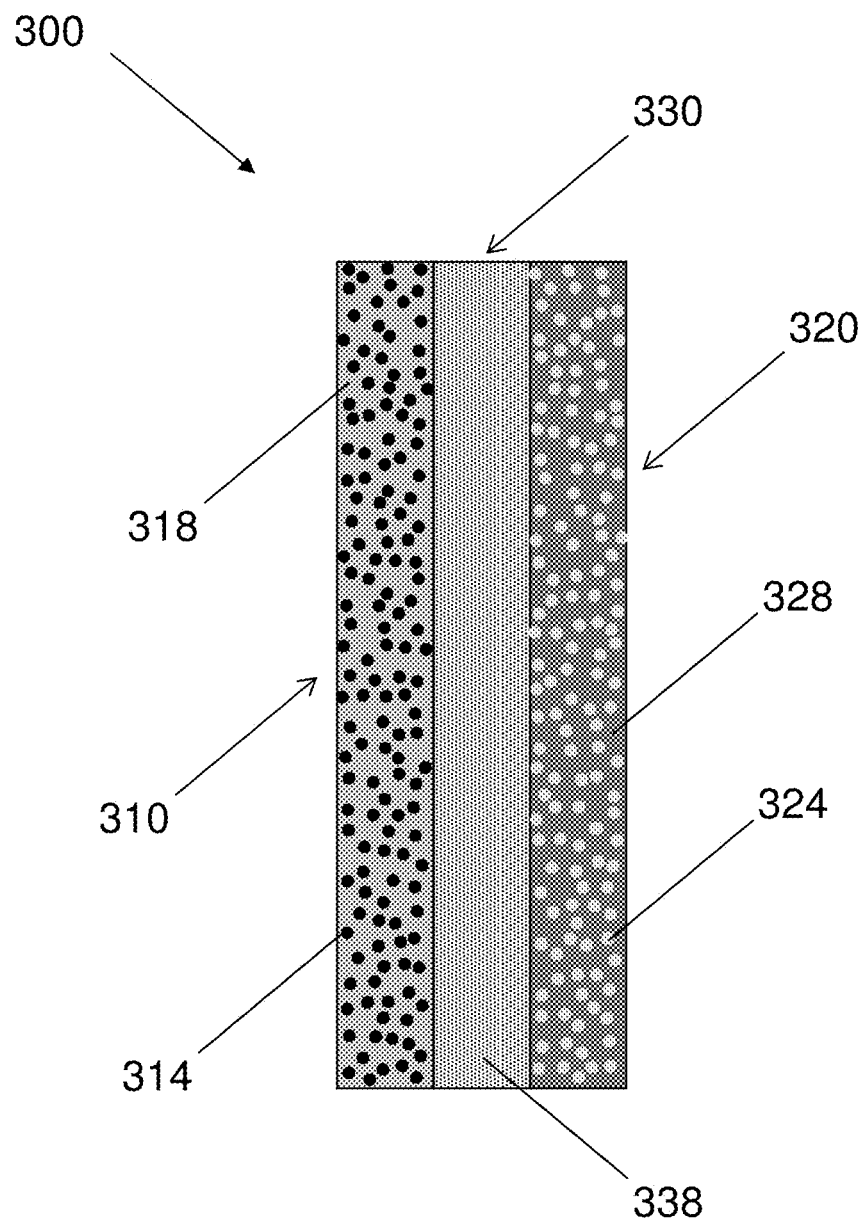
FIG. 3 is a schematic illustration of an electrochemical cell, according to an embodiment of the invention.

FIG. 3 is a schematic cross section that shows an electrochemical cell in an exemplary embodiment of the invention. The cell 300 has a negative electrode assembly 310, a positive electrode assembly 320, with an intervening separator 330. The exemplary negative electrode assembly 310 is the same as the one shown in FIG. 1a. The negative electrode assembly 310 is an aggregation of negative electrode active material particles 314 dispersed within a NE dry polymer electrolyte 318. There can also be electronically-conducting particles such as carbon particles (not shown) in the negative electrode assembly 310. The exemplary positive electrode assembly 320 is the same as the one shown in FIG. 2a. The positive electrode assembly 320 is an aggregation of positive electrode active material particles 324 dispersed within a PE dry polymer electrolyte 328. There can also be electronically-conducting particles such as carbon particles (not shown) in the positive electrode assembly 320. In other exemplary embodiments, other electrode assembly configurations, such as those shown in FIGS. 1 and 2, can be substituted in the electrochemical cell shown in FIG. 3.

The NE electrolyte 318 and the PE electrolyte 328 are each optimized for their respective electrodes as has been discussed above. In one arrangement, the NE electrolyte 318 and the PE electrolyte 328 are different. In another arrangement, the NE electrolyte 318 and the PE electrolyte 328 are the same. The separator 330 contains a separator electrolyte 338, which is also optimized for its role in the cell 300. In one arrangement, the separator electrolyte 338 is immiscible with both the NE electrolyte 318 and the PE electrolyte 328. In another arrangement, the separator electrolyte 338 is miscible with either or both of the NE electrolyte 318 and the PE electrolyte 328, and selectively permeable membranes (not shown) are positioned at interfaces between the miscible electrolytes. In one arrangement, the separator electrolyte 338 is the same as either the NE electrolyte 318 or the PE electrolyte 328. In another arrangement, the separator electrolyte 338 is different from both the NE electrolyte 318 and the PE electrolyte 328.

In one arrangement, the NE electrolyte 318, the PE electrolyte 328, and the separator electrolyte 338 are all solid electrolytes. In some arrangements, solid electrolytes can be made of ceramic materials or polymer materials. In one arrangement, solid electrolytes can be made of dry polymer materials. In one arrangement, the solid electrolytes are block copolymer electrolytes. In some arrangements, one or more of the NE electrolyte 318, the PE electrolyte 328, and the separator electrolyte 338 is a liquid. When a liquid electrolyte is used, care must be taken to ensure that the liquid cannot diffuse out of its own functional region (i.e., negative electrode assembly, positive electrode assembly, or separator) into other functional regions of the cell. In some arrangements, a selectively permeable membrane is used at any interface where at least one electrolyte is liquid. In other arrangements, the liquid electrolytes that are used are immiscible with any adjacent electrolyte.

Electrolytes

Examples of ceramic electrolytes that can be used in the embodiments of the invention include lithium silicate, lithium borate, lithium aluminate, lithium phosphate, lithium phosphorus oxynitride, lithium silicosulfide, lithium borosulfide, lithium aluminosulfide, and lithium phosphosulfide.

There are a variety of polymer electrolytes that are appropriate for use in the inventive structures described herein. In one embodiment of the invention, an electrolyte contains one or more of the following optionally cross-linked polymers: polyethylene oxide, polysulfone, polyacrylonitrile, siloxane, polyether, polyamine, linear copolymers containing ethers or amines, ethylene carbonate, Nafion®, and polysiloxane grafted with small molecules or oligomers that include polyethers and/or alkylcarbonates.

In one embodiment of the invention, the solid polymer electrolyte, when combined with an appropriate salt, is chemically and thermally stable and has an ionic conductivity of at least $10^{-5}$ Scm$^{-1}$ at a desired operating temperature. Examples of appropriate salts include, but are not limited to metal salts selected from the group consisting of chlorides, bromides, sulfates, nitrates, sulfides, hydrides, nitrides, phosphides, sulfonamides, triflates, thiocynates, perchlorates, borates, or selenides of lithium, sodium, potassium, silver, barium, lead, calcium, ruthenium, tantalum, rhodium, iridium, cobalt, nickel, molybdenum, tungsten or vanadium. Examples of specific lithium salts include LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiN(SO$_2$C$_2$F$_5$)$_2$, LiN(SO$_2$CF$_3$)$_2$, LiN(SO$_2$CF$_2$CF$_3$)$_2$, lithium alkyl fluorophosphates, lithium oxalatoborate, as well as other lithium bis(chelato)borates having five to seven membered rings, lithium bis(trifluoromethane sulfone imide) (LiTFSI), LiPF$_3$(C$_2$F$_5$)$_3$, LiPF$_3$(CF$_3$)$_3$, LiB(C$_2$O$_4$)$_2$, and mixtures thereof. In other embodiments of the invention, for other electrochemistries, electrolytes are made by combining the polymers with various kinds of salts. Examples include, but are not limited to $AgSO_3CF_3$, NaSCN, $NaSO_3CF_3$, KTFSI, NaTFSI, $Ba(TFSI)_2$, $Pb(TFSI)_2$, and $Ca(TFSI)_2$. As described in detail above, a block copolymer electrolyte can be used in the embodiments of the invention.

Figure 4A:
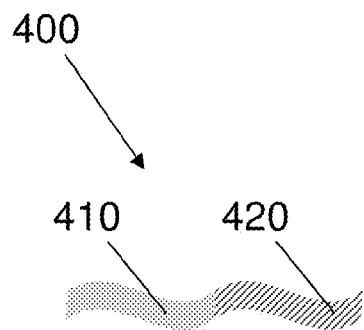
FIG. 4 is a schematic drawing of a diblock copolymer and a domain structure it can form, according to an embodiment of the invention.

FIG. 4A is a simplified illustration of an exemplary diblock polymer molecule 400 that has a first polymer block 410 and a second polymer block 420 covalently bonded together. In one arrangement both the first polymer block 410 and the second polymer block 420 are linear polymer blocks. In another arrangement, either one or both polymer blocks 410, 420 has a comb structure. In one arrangement, neither polymer block is cross-linked. In another arrangement, one polymer block is cross-linked. In yet another arrangement, both polymer blocks are cross-linked.

Figure 4B:
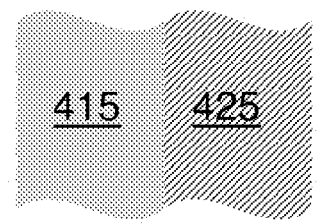
Figure 4C:
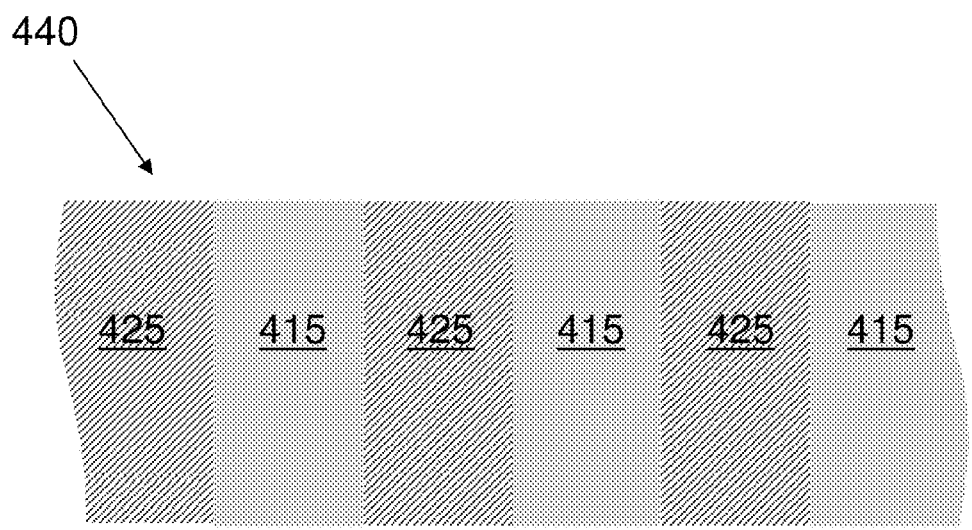

Multiple diblock polymer molecules 400 can arrange themselves to form a first domain 415 of a first phase made of the first polymer blocks 410 and a second domain 425 of a second phase made of the second polymer blocks 420, as shown in FIG. 4B. Diblock polymer molecules 400 can arrange themselves to form multiple repeat domains, thereby forming a continuous nanostructured block copolymer material 440, as shown in FIG. 4C. The sizes or widths of the domains can be adjusted by adjusting the molecular weights of each of the polymer blocks.

In one arrangement the first polymer domain 415 is ionically conductive, and the second polymer domain 425 provides mechanical strength to the nanostructured block copolymer.

Figure 5A:
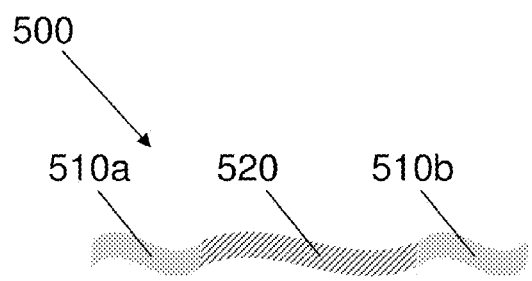
FIG. 5 is a schematic drawing of a triblock copolymer and a domain structure it can form, according to an embodiment of the invention.

FIG. 5A is a simplified illustration of an exemplary triblock polymer molecule 500 that has a first polymer block 510a, a second polymer block 520, and a third polymer block 510b that is the same as the first polymer block 510a, all covalently bonded together. In one arrangement the first polymer block 510a, the second polymer block 520, and the third copolymer block 510b are linear polymer blocks. In another arrangement, either some or all polymer blocks 510a, 520, 510b have a comb structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 5B:
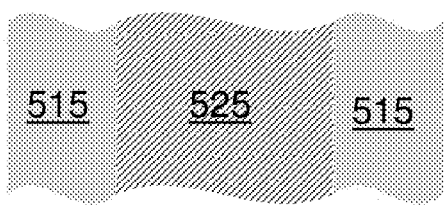
Figure 5C:
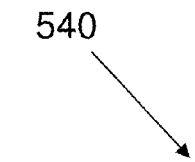

Multiple triblock polymer molecules 500 can arrange themselves to form a first domain 515 of a first phase made of the first polymer blocks 510a, a second domain 525 of a second phase made of the second polymer blocks 520, and a third domain 515b of a first phase made of the third polymer blocks 510b as shown in FIG. 5B. Triblock polymer molecules 500 can arrange themselves to form multiple repeat domains 425, 415 (containing both 415a and 415b), thereby forming a continuous nanostructured block copolymer 530, as shown in FIG. 5C. The sizes of the domains can be adjusted by adjusting the molecular weights of each of the polymer blocks.

In one arrangement the first and third polymer domains 515a, 515b are ionically conductive, and the second polymer domain 525 provides mechanical strength to the nanostructured block copolymer. In another arrangement, the second polymer domain 525 is ionically conductive, and the first and third polymer domains 515 provide a structural framework.

Figure 6A:
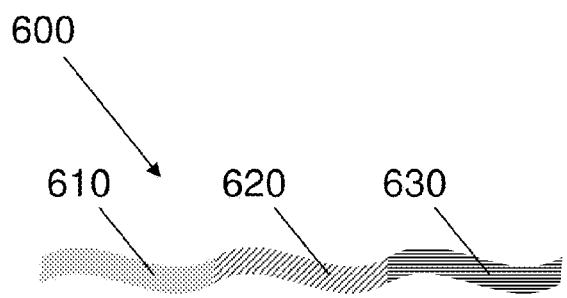
FIG. 6 is a schematic drawing of a triblock copolymer and a domain structure it can form, according to another embodiment of the invention.

FIG. 6A is a simplified illustration of another exemplary triblock polymer molecule 600 that has a first polymer block 610, a second polymer block 620, and a third polymer block 630, different from either of the other two polymer blocks, all covalently bonded together. In one arrangement the first polymer block 610, the second polymer block 620, and the third copolymer block 630 are linear polymer blocks. In another arrangement, either some or all polymer blocks 610, 620, 630 have a comb structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 6B:
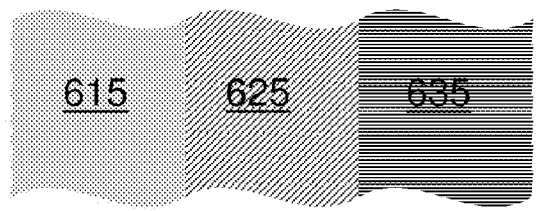
Figure 6C:
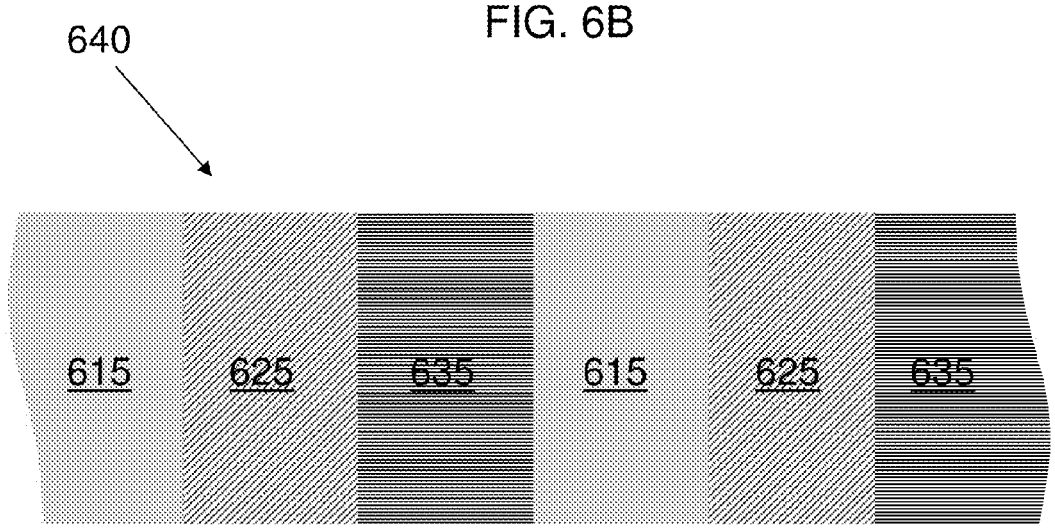

Multiple triblock polymer molecules 600 can arrange themselves to form a first domain 615 of a first phase made of the first polymer blocks 610a, a second domain 625 of a second phase made of the second polymer blocks 620, and a third domain 635 of a third phase made of the third polymer blocks 630 as shown in FIG. 6B. Triblock polymer molecules 600 can arrange themselves to form multiple repeat domains, thereby forming a continuous nanostructured block copolymer 640, as shown in FIG. 6C. The sizes of the domains can be adjusted by adjusting the molecular weights of each of the polymer blocks.

In one arrangement the first polymer domains 615 are ionically conductive, and the second polymer domains 625 provide mechanical strength to the nanostructured block copolymer. The third polymer domains 635 provides an additional functionality that may improve mechanical strength, ionic conductivity, chemical or electrochemical stability, may make the material easier to process, or may provide some other desirable property to the block copolymer. In other arrangements, the individual domains can exchange roles.

Choosing appropriate polymers for the block copolymers described above is important in order to achieve desired electrolyte properties. In one embodiment, the conductive polymer (1) exhibits ionic conductivity of at least $10^{-5}$ Scm$^{-1}$ at electrochemical cell operating temperatures when combined with an appropriate salt(s), such as lithium salt(s); (2) is chemically stable against such salt(s); and (3) is thermally stable at electrochemical cell operating temperatures. In one embodiment, the structural material has a modulus in excess of $1 \times 10^5$ Pa at electrochemical cell operating temperatures. In one embodiment, the third polymer (1) is rubbery; and (2) has a glass transition temperature lower than operating and processing temperatures. It is useful if all materials are mutually immiscible.

In one embodiment of the invention, the conductive phase can be made of a linear polymer. Conductive linear polymers that can be used in the conductive phase include, but are not limited to, polyethers, polyamines, polyimides, polyamides, alkyl carbonates, polynitriles, and combinations thereof. The conductive linear polymers can also be used in combination with polysiloxanes, polyphosphazines, polyolefins, and/or polydienes to form the conductive phase.

In another exemplary embodiment, the conductive phase is made of comb polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, and combinations thereof.

Further details about polymers that can be used in the conductive phase can be found in International Patent Application Number PCT/US09/45356, filed May 27, 2009, International Patent Application Number PCT/US09/54709, filed Aug. 22, 2009, U.S. Provisional Patent Application No. 61/145,518, filed Jan. 16, 2009, U.S. Provisional Patent Application No. 61/145,507, filed Jan. 16, 2009, U.S. Provisional Patent Application No. 61/158,257, filed Mar. 6, 2009, and U.S. Provisional Patent Application No. 61/158,241, filed Mar. 6, 2009, all of which are included by reference herein.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte.

Suitable examples include alkali metal salts, such as Li salts. Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $B_{12}F_xH_{12-x}$, $B_{12}F_{12}$, and mixtures thereof. Non-lithium salts such as salts of aluminum, sodium, and magnesium are examples of other salts that can be used.

In one embodiment of the invention, single ion conductors can be used with electrolyte salts or instead of electrolyte salts. Examples of single ion conductors include, but are not limited to sulfonamide salts, boron based salts, and sulfates groups.

In one embodiment of the invention, the structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, fluorocarbons, such as polyvinylidene fluoride, or copolymers that contain styrene, methacrylate, or vinylpyridine.

Additional species can be added to nanostructured block copolymer electrolytes to enhance the ionic conductivity, to enhance the mechanical properties, or to enhance any other properties that may be desirable.

The ionic conductivity of nanostructured block copolymer electrolyte materials can be improved by including one or more additives in the ionically conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+[salt] complexes. Additives that weaken the interaction between Li+ and PEO chains/anions, thereby making it easier for Li+ ions to diffuse, may be included in the conductive phase. The additives that enhance ionic conductivity can be broadly classified in the following categories: low molecular weight conductive polymers, ceramic particles, room temp ionic liquids (RTILs), high dielectric organic plasticizers, and Lewis acids.

Other additives can be used in the polymer electrolytes described herein. For example, additives that help with overcharge protection, provide stable SEI (solid electrolyte interface) layers, and/or improve electrochemical stability can be used. Such additives are well known to people with ordinary skill in the art. Additives that make the polymers easier to process, such as plasticizers, can also be used.

In one embodiment of the invention, neither small molecules nor plasticizers are added to the block copolymer electrolyte and the block copolymer electrolyte is a dry polymer.

Further details about block copolymer electrolytes are described in U.S. patent application Ser. No. 12/225,934, filed Oct. 1, 2008, U.S. patent application Ser. No. 12/271,1828, filed Nov. 14, 2008, and International Patent Application Number PCT/US09/31356, filed Jan. 16, 2009, all of which are included by reference herein.

EXAMPLES

The ionic conductance of each component of the cell can be determined. In general, conductance, G is given by:

$$G = \frac{\sigma A}{l}, \quad (1)$$

where σ is ionic conductivity, A is cross-sectional area, and l is length. Two conductances in series, $G_1$, $G_2$ have a total conductance $G_{tot}$ given by:

$$G_{tot} = \frac{G_1 G_2}{G_1 + G_2} \quad (2)$$

When the electrode assembly has a composite configuration, the ionic conductance can be calculated easily from equation (1). When the electrode assembly has a multiple layer configuration, the conductance of each layer is found, and the total conductance is given by equation (2). In one embodiment of the invention, the conductance of the negative electrode assembly and the conductance of the positive electrode assembly have a difference of no more than 25%. In another embodiment of the invention, the conductance of the NE electrode assembly, the conductance of the PE electrode assembly, and the conductance of the separator electrolyte are all within 25% of one another. Matching conductances in this way can result in a cell with an optimized, minimal impedance profile.

Figure 7:
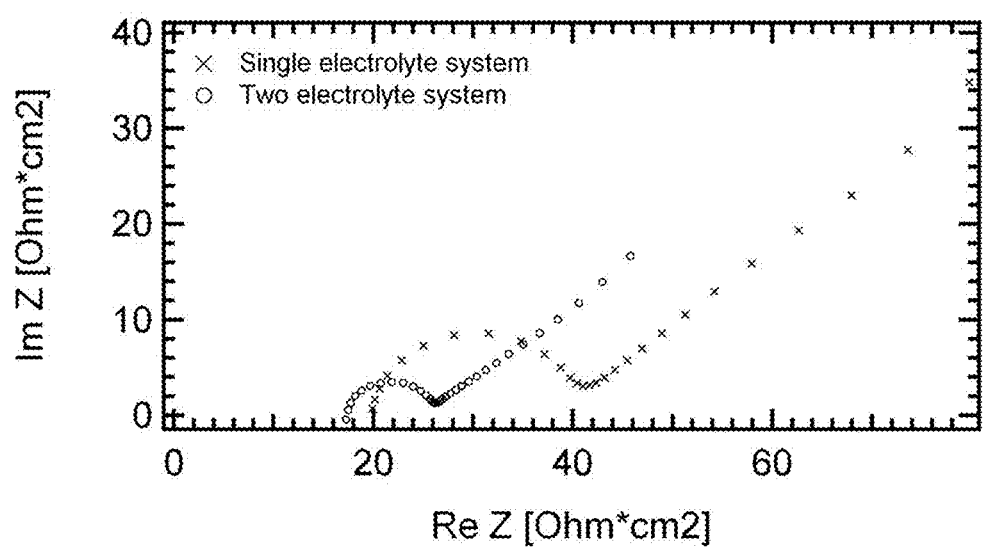
FIG. 7 shows a complex impedance plot for a single electrolyte system (x) and for a two electrolyte system (o).

FIG. 7 shows a complex impedance plot for a single electrolyte system (x) and for a two electrolyte system (o). The two electrolyte cell has a first dry polymer electrolyte optimized for stability against the lithium metal anode film and a second dry polymer electrolyte optimized for low interfacial impedance against the composite cathode. The single electrolyte cell contains only the first dry polymer electrolyte. As is well known to a person having ordinary skill in the art, the size of the kinetic arc in the plot reflects the total resistance of the system. One might anticipate that adding an additional interface (first polymer electrolyte/second polymer electrolyte interface) could add additional resistance to the system. But, surprisingly, the two electrolyte system has lower total resistance, as indicated by the smaller kinetic arc (o), than the single electrolyte system. There is a clear advantage in using multiple electrolytes optimized for their functions in the cell.

Figure 8A:
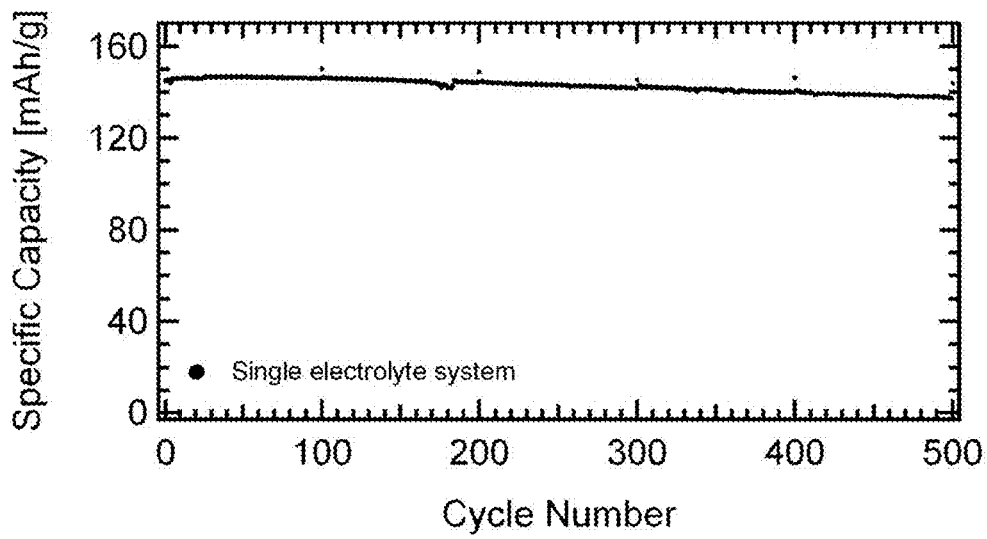
FIG. 8A and FIG. 8B show specific capacity data over 500 cycles for a cell that contains one dry polymer electrolyte and specific capacity data over 100 cycles for a two-electrolyte cell, respectively.
Figure 8B:
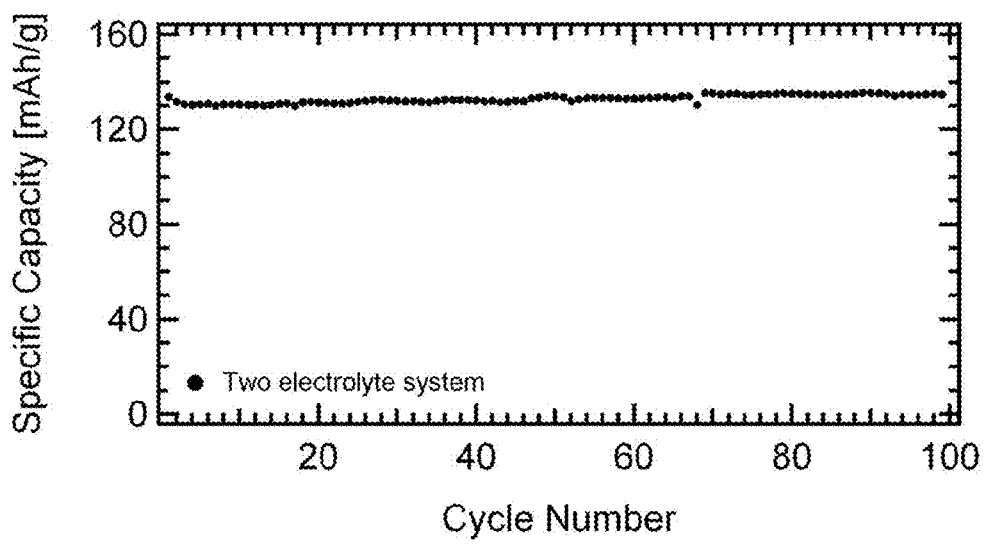

FIG. 8A shows specific capacity data over 500 cycles for a cell that contains one dry polymer electrolyte, a lithium metal anode and a lithium iron phosphate composite cathode. There is no measurable capacity fade over the first 100 cycles. After 500 cycles the capacity fade is estimated to be about 5%. FIG. 8B shows specific capacity data over 100 cycles for a two-electrolyte cell. There is a first dry polymer electrolyte optimized for stability against the lithium metal anode film and a second dry polymer electrolyte optimized for conductivity in and over the composite cathode. Again, there is no measurable capacity fade over the first 100 cycles, indicating that there are no adverse effects from using the multi-layered electrolyte.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An electrochemical cell, comprising:
   a negative electrode assembly comprising negative electrode active material and a negative electrode electrolyte, the negative electrode electrolyte being reductively stable against the negative electrode active material; and
   a positive electrode assembly comprising positive electrode active material and a positive electrode electrolyte, the positive electrode electrolyte being oxidatively stable against the positive electrode active material;
   wherein the negative electrode electrolyte and the positive electrode electrolyte are not the same;
   and wherein at least one of the negative electrode electrolyte and the positive electrode electrolyte comprises a nanostructured block copolymer that comprises:
      first blocks that are ionically conductive, the first blocks arranged into first domains of a first ionically conductive phase; and
      second blocks that provide mechanical strength, the second blocks arranged into second domains of a second structural phase, the second structural phase having a modulus in excess of $1 \times 10^5$ Pa at electrochemical cell operating temperatures; and
   a metal salt.

2. The electrochemical cell of claim 1 wherein at least one of the negative electrode electrolyte and the positive electrode electrolyte comprises a dry polymer.

3. The electrochemical cell of claim 1, wherein the negative electrode electrolyte and the positive electrode electrolyte comprise at least one lithium salt.

4. The electrochemical cell of claim 1, further comprising electronically conducting particles in at least a portion of the positive electrode assembly.

5. The electrochemical cell of claim 1 further comprising a separator electrolyte between the negative electrode assembly and the positive electrode assembly.

6. The electrochemical cell of claim 1 wherein the negative electrode assembly comprises a layer comprising the negative electrode active material adjacent a layer of the negative electrode electrolyte.

7. The electrochemical cell of claim 6 wherein the negative electrode active material comprises a lithium or lithium alloy foil.

8. The electrochemical cell of claim 7 wherein the lithium alloy foil comprises a lithium-aluminum alloy that has no more than 0.5 weight % aluminum.

9. The electrochemical cell of claim 1 wherein the negative electrode electrolyte is a solid electrolyte that has a yield strain greater than or equal to a maximum volume expansion of the negative electrode material.

10. The electrochemical cell of claim 1 wherein the positive electrode assembly comprises particles of the positive electrode active material mixed together with the positive electrode electrolyte.

11. The electrochemical cell of claim 1 wherein the positive electrode assembly comprises a layer comprising the positive electrode active material adjacent a layer of the positive electrode electrolyte.

12. The electrochemical cell of claim 1 wherein the positive electrode active material is described by the general formula $Li_x(Fe_yM_{1-y})PO_4$, wherein M comprises at least one element selected from the group consisting of Mn, Co and Ni; x is described by $0.9 \leq x \leq 1.1$; and y is described by $0 \leq y \leq 1$.

13. The electrochemical cell of claim 1 wherein the positive electrode active material comprises an electrochemically active cation, and less than 10% of the electrochemically active cation dissolves from the positive electrode active material after 500 cycles in the temperature range 45-80° C.

14. The electrochemical cell of claim 1 wherein the positive electrode active material comprises an electrochemically active cation, and less than 5% of the electrochemically active cation dissolves from the positive electrode active material after 500 cycles in the temperature range 45-80° C.

15. The electrochemical cell of claim 1 wherein the positive electrode active material comprises an electrochemically active cation, and less than 1% of the electrochemically active cation dissolves from the positive electrode active material after 500 cycles in the temperature range 45-80° C.

16. The electrochemical cell of claim 1 wherein the block copolymer is either a diblock copolymer or a triblock copolymer.

17. The electrochemical cell of claim 16 wherein a first block of the block copolymer is ionically conductive and is selected from the group consisting of polyethers, polyamines, polyimides, polyamides, alkyl carbonates, polynitriles, polysiloxanes, polyphosphazines, polyolefins, polydienes, and combinations thereof.

18. The electrochemical cell of claim 16 wherein a first block of the block copolymer comprises an ionically-conductive comb polymer, which comb polymer comprises a backbone and pendant groups.

19. The electrochemical cell of claim 18 wherein the backbone comprises one or more selected from the group consisting of polysiloxanes, polyphosphazines, polyethers, polydienes, polyolefins, polyacrylates, polymethacrylates, and combinations thereof.

20. The electrochemical cell of claim 18 wherein the pendants comprise one or more selected from the group consisting of oligoethers, substituted oligoethers, nitrile groups, sulfones, thiols, polyethers, polyamines, polyimides, polyamides, alkyl carbonates, polynitriles, other polar groups, and combinations thereof.

21. The electrochemical cell of claim 16 wherein a second block of the block copolymer is selected from the group consisting of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, fluorocarbons, polyvinylidene fluoride, and copolymers that contain styrene, methacrylate, and/or vinylpyridine.

22. The electrochemical cell of claim 1 wherein the cell has a Li cycling efficiency greater than 99.9% over 500 cycles.

23. The electrochemical cell of claim 1 wherein the cell has a Li cycling efficiency greater than 99.7% over 500 cycles.

24. The electrochemical cell of claim 1 wherein, at the negative electrode assembly and/or the positive electrode assembly, there is an impedance value after 10 cycles and the value increases by no more than 40% after 500 cycles.

25. The electrochemical cell of claim 1 wherein, at the negative electrode assembly and/or the positive electrode assembly, there is an impedance value after 10 cycles and the value increases by no more than 20% after 500 cycles.

26. The electrochemical cell of claim 1 wherein, at the negative electrode assembly and/or the positive electrode assembly, there is an impedance value after 10 cycles and the value increases by no more than 10% after 500 cycles.

27. The electrochemical cell of claim 1 wherein there is a capacity value after 10 cycles and the value decreases by no more than 40% after 500 cycles.

28. The electrochemical cell of claim 1 wherein there is a capacity value after 10 cycles and the value decreases by no more than 20% after 500 cycles.

29. The electrochemical cell of claim 1 wherein there is a capacity value after 10 cycles and the value decreases by no more than 10% after 500 cycles.

30. The electrochemical cell of claim 1 wherein there is a difference of no more than 25% between ionic conductance of the negative electrode assembly and ionic conductance of the positive electrode assembly.

31. The electrochemical cell of claim 1, further comprising a separator electrolyte between the negative electrode assembly and the positive electrode assembly, the separator electrolyte different from at least one of the negative electrode electrolyte and/or the positive electrode electrolyte.

32. The electrochemical cell of claim 31 wherein the separator electrolyte is selected from the group consisting of ceramic electrolytes, polymer electrolytes, and block copolymer electrolytes.

33. The electrochemical cell of claim 31 wherein the separator electrolyte comprises a solid electrolyte.

34. The electrochemical cell of claim 31 wherein the conductance of the negative electrode assembly, the conductance of the positive electrode assembly, and the conductance of the separator electrolyte are all within 25% of one another.

35. The electrochemical cell of claim 1 wherein the nanostructured block copolymer is a linear block copolymer.

36. An electrochemical cell, comprising:
a negative electrode comprising a film of lithium metal and a film of a negative electrode electrolyte that is reductively stable against the lithium metal; and
a positive electrode comprising nickel cobalt aluminum oxide and a positive electrode electrolyte that is oxidatively stable against the nickel cobalt aluminum oxide;
wherein the negative electrode electrolyte and the positive electrode electrolyte are not the same; and
and wherein at least one of the negative electrode electrolyte and the positive electrode electrolyte comprises a nanostructured block copolymer that comprises:
first linear blocks that are ionically conductive, the first blocks arranged into first domains of a first ionically conductive phase;
second linear blocks that provide mechanical strength, the second blocks arranged into second domains of a second structural phase, the second structural phase having a modulus in excess $1 \times 10^5$ Pa at electrochemical cell operating temptures; and
a metal salt.

37. The electrochemical cell of claim 36 wherein the negative electrode electrolyte and the positive electrode electrolyte are each selected independently from the group consisting of dry polymer electrolytes and block copolymer electrolytes.

* * * * *